No. 753,610. Patented March 1, 1904.

UNITED STATES PATENT OFFICE.

JOHN G. McDOWELL, OF PITTSBURG, PENNSYLVANIA.

METHOD OF CLEANING AND COATING PIPES.

SPECIFICATION forming part of Letters Patent No. 753,610, dated March 1, 1904.

Application filed September 25, 1903. Serial No. 174,590. (No specimens.)

*To all whom it may concern:*

Be it known that I, JOHN G. McDOWELL, of Pittsburg, Allegheny county, Pennsylvania, have invented a new and Improved Method of Cleaning and Coating Pipes, of which the following is a full, clear, and exact description.

Heretofore in cleaning pipe for enameling the pipe has been pickled in a solution of sulfuric or muriatic acid and then the pipe taken out and a blast of air and sand driven through it to cut out and remove the scale. I have discovered that by pickling the pipe with a solution of commercial salt cake or niter cake and then cleaning out the scale by a current of a fluid under pressure driven through the pipe I can prepare it without the use of any cutting material, such as sand.

In using my method I dissolve the commercial salt cake in water and preferably heat the solution, as this hastens its action. I then immerse the pipe in the solution until the scale is loosened and then take out the pipe and drive a current of fluid under pressure through it. This fluid may be steam, hot air, water, or other fluid, and I preferably use a jet-nozzle to insert in the end of the pipes for directing the current to drive out the loosened and powdered scale. The commercial salt cake or niter-cake has a small amount of free acid in it, which starts the pickling action; but the solution will not injure the iron or steel of the pipe, as does an ordinary acid solution. At the same time the scale is more effectually loosened than by ordinary pickle, and the fluid current, free from abrading material, will drive it out.

Ordinary commercial salt cake contains ninety-six or ninety-seven per cent. of $Na_2SO_4$ and from one to one and five-tenths per cent. and upwardly of free acid. Niter cake is usually uneven in quality, but also contains a small amount of free acid, which starts the reactions.

My method is of advantage on account of cheapness and doing away with a sand-blast in which the sand cuts and abrades the pipe. I prefer to use steam as the fluid, since it dries the pipe and prevents rusting.

I claim—

1. The method of preparing pipe for coating consisting in subjecting it to a pickling liquid containing salt cake or niter cake having a small percentage of free acid, and then removing it, and driving a fluid current through the pipe; substantially as described.

2. The method of coating pipe consisting in pickling it in a solution of commercial salt cake or niter cake having a small percentage of free acid, then passing a current of fluid free from abrading material through it, and then coating the cleaned pipe; substantially as described.

3. The method of pickling metal, consisting in immersing it in a solution of commercial salt cake or niter cake, containing a small percentage of free acid; substantially as described.

4. The method of coating pipe consisting in pickling it in a solution of commercial salt cake or niter cake having a small percentage of free acid, then forcing a current of gaseous fluid free from abrading material under pressure through the pipe and then coating the cleaned pipe; substantially as described.

5. The method of coating pipe consisting in pickling the pipe, then passing a current of hot gaseous fluid under pressure through it, and then coating the cleaned pipe; substantially as described.

In testimony whereof I have hereunto set my hand.

JOHN G. McDOWELL.

Witnesses:
   Y. L. PHILLIPS,
   G. W. PHILLIPS.